United States Patent [19]

Deller et al.

[11] Patent Number: 5,108,717

[45] Date of Patent: Apr. 28, 1992

[54] APPARATUS FOR THE CATALYTIC CONVERSION OF WASTE GASES

[75] Inventors: Klaus Deller, Hainburg; Hans Moesinger, Rodenbach; Herbert Mueller, Karlstein; Josef Riedel, Burgkirchen; Wenzel Kuehn, Burgkirchen; Rudolf Spielmannleitner, Altoetting, all of Fed. Rep. of Germany

[73] Assignee: Degussa Aktiengesellschaft, Frankfurt am Main, Fed. Rep. of Germany

[21] Appl. No.: 595,845

[22] Filed: Oct. 11, 1990

Related U.S. Application Data

[62] Division of Ser. No. 247,297, Sep. 21, 1988, Pat. No. 4,983,366.

[30] Foreign Application Priority Data

Sep. 21, 1987 [DE] Fed. Rep. of Germany ....... 3731688

[51] Int. Cl.$^5$ ................................................ B01J 8/04
[52] U.S. Cl. ...................................... 422/171; 41/173; 41/181; 41/182; 41/183
[58] Field of Search .............. 423/240 S, 245.3, 245.1; 422/171, 173, 176, 177, 180, 181, 182, 183, 192, 218

[56] References Cited

U.S. PATENT DOCUMENTS

| | | | |
|---|---|---|---|
| 3,169,836 | 2/1965 | Davis | 422/171 |
| 3,492,148 | 1/1970 | Heavert | 502/527 |
| 3,649,213 | 3/1972 | De Palma et al. | 422/177 |
| 3,685,972 | 8/1972 | De Palma et al. | 422/177 |
| 3,712,856 | 1/1973 | Betz | 502/309 |
| 3,736,105 | 5/1973 | Tourtellotte et al. | 422/176 |
| 3,817,716 | 6/1974 | Betz | 423/245.3 |
| 3,972,979 | 8/1976 | Kogeyama | 423/240 S |
| 3,996,016 | 12/1976 | Wagner | 422/176 |
| 4,059,676 | 11/1977 | Tang et al. | 423/240 S |
| 4,654,203 | 3/1987 | Mauer et al. | 423/240 S |

Primary Examiner—Peter Kratz
Attorney, Agent, or Firm—Beveridge DeGrandi & Weilacher

[57] ABSTRACT

Apparatus for the catalytic conversion of waste gases such as those which accumulate in the synthesis of vinyl chloride is presented in which the waste gases are successively treated at an elevated temperature with a catalyst for oxidative cracking and with a catalyst for oxidative afterburning.

1 Claim, 1 Drawing Sheet

APPARATUS FOR THE CATALYTIC CONVERSION OF WASTE GASES

This application is a division, of application Ser. No. 07/247,297, filed Sep. 21, 1988 now U.S. Pat. No. 4,983,366.

INTRODUCTION AND BACKGROUND

The present invention relates to a method for the catalytic conversion of waste gases containing hydrocarbons, halogenated hydrocarbons and carbon monoxide, especially from syntheses carried out in the preparation of vinyl chloride. In a further aspect, the present invention also relates to an apparatus for carrying out the aforesaid method.

In addition to the increasing pollution of the air by $SO_2$ and $NO_x$, the emission of hydrocarbons and especially halogenated hydrocarbons has become a serious problem. Thus, for example, waste gases accumulate in preparation processes carried out for making vinyl chloride which contains, in part, extremely noxious substances. A maintenance of the TA air, "Novelle" 1986, Emissionswerte [Emission Values], is best achieved by means of an additional cleaning of waste gases.

Of the great number of known measures for reducing emissions of substances which pollute the air, thermal or catalytic cleaning methods are those primarily used to this end since especially high levels of cleaning effect are achieved with them.

Thus for example, in thermal afterburning, the pollutants to be eliminated are oxidized under conditions supplying energy at temperatures up to 1500° C. in a combustion chamber ("VDI-Berichte" 525, Katalytische and thermische Verfahren der Abgasreinigung [Catalytic and Thermal Methods of Cleaning Waste Gases], Meeting, Apr. 7,8, 1985, VDI-Verlag, Dusseldorf, 1985, p. 347).

The dwell time in the combustion chamber is at least 1 s (VDI loc. cit., p. 347). In accordance with economic considerations, thermal cleaning is only advantageous in the case of high concentrations of pollutants. A considerable disadvantage resides in the costs for the generation and maintenance of the conversion temperatures as well as in the fact that the heat energy released during the afterburning process can not always be utilized in an economical fashion.

Catalytic afterburning is usually performed with the aid of noble metal catalysts at approximately 300°–700° C. and with dwell times up to 0.3 s. It is to be preferred in the case of low concentrations of pollutants and is distinguished in comparison to the thermal method by distinctly lower operating costs (VDI loc. cit., p. 75). However, there are limitations when using the catalytic method, based on a possible reduction of activity of the catalyst due to too high thermal loading or chemical deactivation by means of catalytic poisons present in the waste gas (VDI loc. cit., p. 75).

When using the more economical catalytic cleaning of waste gas resulting from the preparation processes used for making vinyl chloride, the problem confronting the industry involved keeping the thermal loading of the catalyst low by means of chemical techniques, thus counteracting a poisoning effect as much as possible.

SUMMARY OF THE INVENTION

An object of the invention is to provide a method for the catalytic conversion of waste gases containing hydrocarbons, halogenated hydrocarbons and carbon monoxide, especially those obtained from the synthesis of vinyl chloride. In achieving the above and other objects, one feature of the invention resides in a first step of passing the waste gases at 300°–800° C., preferably 350°–730° C. through a first zone containing a catalyst for oxidative cracking and then through a second zone containing a catalyst for oxidative afterburning. The entrance temperature of the waste gas must be above the ignition temperature of the catalyst. In order to achieve sufficient conversion, the waste gas temperature immediately prior to entry into the first zone should not be under 300° C. and not exceed 800° C. in both zones in order to avoid thermal damage to the catalyst. Oxidative cracking of rather long-chain, aromatic-aliphatic hydrocarbons (1) (see equation below) into smaller molecules, oxidative afterburning of unsaturated and saturated hydrocarbons and halogenated hydrocarbons (2) and oxidation of CO to $CO_2$ (3) take place in the catalytic zones according to the following:

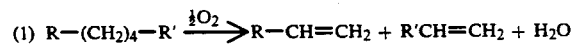

(1) $R-(CH_2)_4-R' \xrightarrow{\frac{1}{2}O_2} R-CH=CH_2 + R'CH=CH_2 + H_2O$

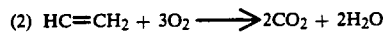

(2) $HC=CH_2 + 3O_2 \longrightarrow 2CO_2 + 2H_2O$

$H_2C=CHCl 2.5O_2 \longrightarrow 2CO_2 + H_2O + HCl$

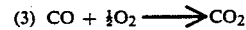

(3) $CO + \frac{1}{2}O_2 \longrightarrow CO_2$

Basically, all catalysts indicated in the literature and customary for the catalytic purification of waste gases can be used to this end. Thus invention can be carried out with desired combinations of catalysts as is also known from the literature.

In general, all catalytic systems known for oxidative cracking of organic compounds can be used in the first zone. In the instant, special case of the catalytic conversion of waste gases containing hydrocarbons, halogenated hydrocarbons and carbon monoxide, especially waste gases obtained from the synthesis of vinyl chloride, it has proven to be very important to use a catalyst which brings about only a partial conversion. In particular, the reactions which occur here in the presence of an excess of air are oxidative decompositions, dehalogenations and dehydrohalogenations. Impurities such as aliphatic and aromatic hydrocarbons and chlorinated hydrocarbons such as ethyl chloride, vinyl chloride and 1,2-dichloroethane, etc. are converted to a large extent whereas substances such as methyl chloride and methane are converted only partially and carbon monoxide practically not at all.

A considerable portion of the reaction heat is already released in the first zone by the preliminary conversion there so that temperature peaks in the following second zone of the very active second catalyst with an associated sintering of carrier material and catalytically active phase are avoided to a large extent; this has an advantageous effect on the service life of this catalyst.

The relatively insensitive catalyst of the first zone functions, in addition, as a filter for heavy metals from apparatuses and pipelines and for other catalyst poisons. As a result of its surface quality, it exhibits the property of catching the Cl atoms produced in situ during the reaction on the surface and thus protecting the subsequent sensitive catalyst of the second zone to a large extent from poisonings. Especially preferred, catalytically active substances for the catalyst of the first zone are aluminum oxide, silicon dioxide, aluminum silicate and/or a zeolite, optionally with a content of 0.1–20% by weight of oxidic compounds of one or more of the elements Ba, Mg, Cu, Cr, Mn, Ni.

The catalyst of the second zone is used to accomplish as complete as possible a conversion of the thermally stable hydrocarbons and halogenated hydrocarbons as well as for the oxidation of carbon monoxide. It must therefore furnish a good oxidation action. Fundamentally, base metal catalysts or solid contacts as well as noble metal catalysts can be used here. Especially good results are obtained if the catalytically active substance of the catalyst of the second zone is platinum and/or palladium or platinum and rhodium. In these instances, platinum and palladium can be present in a weight ratio of 1:5–5:1 and platinum and rhodium in a weight ratio of 5:1–20:1.

BRIEF DESCRIPTION OF DRAWING

The invention will be further understood with reference to the drawing, wherein there is shown in schematic form the flow diagram and apparatus for the present invention.

DETAILED DESCRIPTION OF INVENTION

Figure 1:
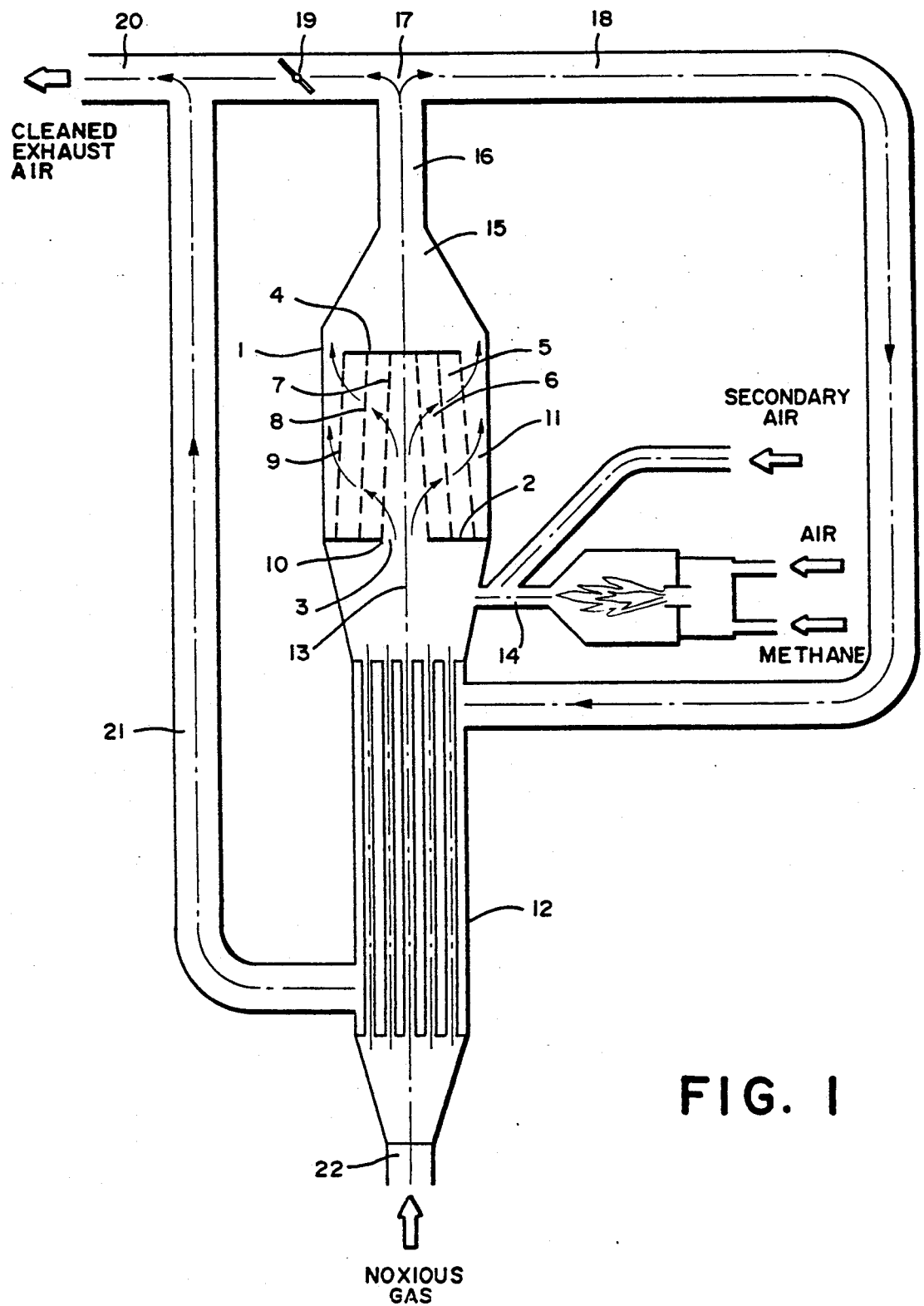

Many varied embodiments can be used for the catalysts of the first and/or second zone. It has proven to be advantageous if the catalyst of the first and/or second zone is formed as non-shaped or shaped bulk material made of the catalytic substance or in the form of carrier bodies provided with a coating of the catalytically active component, or as monolith coated with a carrier material for the catalytically active component which carrier material promotes catalysis, or as monolith provided with the catalytically active component, or as monolith of material which promotes catalysis, or as monolith of the catalytic material itself.

The non-shaped or shaped bodies of bulk material can be present e.g. as granulate, pellets, balls, tablets, extrudate, extrusion compacts briquettes, hollow billets, saddles, grids or in any shaped embodiments which are provided with the catalytically active substance by immersion, dipping, spray impregnation, sputtering or according to any other generally customary methods. If porous carrier material is used, the catalytically active components can be evenly distributed in the entire shaped body or, preferably, concentrated on the outer surface. Such a so-called shell catalyst can also comprise an inert core of solid material such as e.g. $\alpha$-$Al_2O_3$ or cordierite, e.g. in ball form or as honeycomb body, for structural reinforcement.

As a result of the mode of operation of both catalytic layers, which are coordinated with each other in a purposeful manner, the operable life-times are achieved even with the more sensitive noble-metal catalyst of the second zone which were not possible previously in traditional single-bed methods with such catalysts.

A particularly advantageous embodiment of the method of the invention provides that the two catalysts are arranged as a double bed or at a distance in spaced relationships from one another. The double-bed design is particularly space-saving and therefore associated with the least equipment costs. On the other hand, the arranging of the zones at a distance from one another assures a more even temperature distribution brought about by means of vortexing of the waste gas prior to entry into the second zone. In addition, a certain cooling of the gas (e.g. by feeding in air) can be brought about with this arrangement, especially at a high heat value of the waste gas, in order to protect the catalyst of the second zone from overheating. The distance between the two zones can be selected as desired and is limited as a maximum spacing only by the dimensions of the equipment.

In order to assure as large a flow, attack surface area as possible in the available inner area of the reactor, the waste gas is guided according to a preferred embodiment of the invention through an annular arrangement of the two catalytic zones. This annular arrangement is cylindrical. The direction of flow can be selected so that the waste gas is guided through the cylindrical arrangement from the outside toward the inside or vice versa. The catalytic zones can be designed as a heaped bed and/or a monolithic arrangement. The monoliths can consist of ceramics, or conventional metal honeycombs can also be used. If monolithic or fixed-bed catalysts or a combination of these catalysts is used, the zones can be arranged in the form of a polygon. The base area of the polygon can potentially be a triangle to an octagon, in which instances the annular area can be retained.

The heat generated during the catalytic conversion can be used to preheat the waste gas to be cleaned in a heat exchanger heated by the cleaned waste gas.

Since chemical reactions of mixtures of substances exhibit differing activation energy, in order to achieve the starting temperature of the less active catalyst, which comes into contact with the waste gas first (that of the first layer), the waste gas to be cleaned must usually be temporarily heated by external heating to the ignition temperature of the catalyst, in this specific application approximately 400° C., when the reactor is started. Possible types of external heating are e.g. gas burners, IR radiators, ignition by means of electrode (via generation and spreading of a heat envelope or other energy sources. If the heating value of the waste gas to be converted is sufficiently high, the reactor can also be operated without external heating after the ignition temperature has been achieved along with an appropriate guiding of the waste gas. The pressure conditions in the combustion of waste gas are not critical. The conversion can be performed at normal pressure to 10 bars excess pressure.

In another aspect of the present invention there is provided a simple and purposeful apparatus for carrying out the method of the invention. This apparatus, schematically shown in the single drawing, is characterized by a cylindrical reactor housing (1) with a circular opening (3) defined by an annular bottom (2), an arrangement of three cylinders (7),(8),(9) with perforated jackets which cylinders are placed at intervals according to the thickness of two annular layers (5,6) of bulk catalytic material to be received therein (not shown) and which cylinders rest on the annular bottom, whereby the arrangement of cylinders rests on the annular bottom in a gastight manner and is closed at the top by a plate (4). The first, inner jacket (7) of the group of jackets is aligned with edge (10) of bottom opening (3), the second jacket (8) of which separates the two catalytic layers and the outer jacket (9) of which is at a uniform distance or a distance which widens out in an upward direction. The annular space (11) is thereby formed with the wall of the reactor housing. A feature of the apparatus is a mixing and preheating zone (13) adjacent to the bottom of the reactor housing and communicating with the secondary side of heat exchanger (12), into which zone (13) line (14) for the supply of a gaseous heating medium empties laterally. Waste gas line (16) communicates with head area (15) of the reactor housing, in accordance with a feature of the invention which line (16) runs to shunt (17) from which a branch line (18) communicates with the inlet connection piece of the heat exchanger for the heating medium and another branch line communicates via closing member (19) with waste gas discharge (20) of the apparatus. The outlet connection piece of the heat exchanger for the heating medium in another feature of the invention communicates via line (21) directly with waste gas discharge (20) and the primary side of the heat exchanger is connected to supply line (22) for the waste gas to be converted.

The apparatus described above can be varied in such a manner that the two catalytic layers consist of superimposed monolithic catalysts and/or bulk material catalysts and the cylindrical holder arrangement of claim (15) is replaced with replacement of cylinders (7,8,9) by a polygonal arrangement of known holder devices for monoliths or fixed beds.

If it is desired that the preheating of the waste gas to be converted to ignition temperature be performed exclusively in the heat exchanger, the apparatus can be varied in such a manner that the line for the supply of the gaseous heating medium does not empty in zone (13) but rather in head room (15) of the reactor housing.

The operation of the apparatus shown by way of example in the drawing is as follows:

The waste gas to be converted enters at (22) into heat exchanger (12), then passes into mixing and preheating zone (13) where it is preheated to the required starting temperature of the catalyst by means of a gaseous heating medium supplied via line (14). The heating medium is produced in a burner arrangement by burning a mixture of methane and air. If required, secondary air can be added after the burner for afterburning.

The preheated waste gas then passes successively through catalytic layers (6,5). The catalyst to be located in space (6) is a catalyst for oxidative fission and a noble metal oxidation catalyst is in location space (5). The converted waste gas leaves the reactor via annular space (11), head space (15) and line (16) and can then be supplied entirely or partially by the appropriate positioning of flap (19) via line (18) as heating medium to the heat exchanger. Annular space (11) widens out conically upward in the apparatus design shown, thus creating improved flow conditions for the cleaned waste gas passing along the catalytic arrangement with volumetric increase into annular space (11).

If there is high exothermicity in the reactor, the return of waste gas can be practically eliminated. The cleaned waste gas cooled down in heat exchanger (12) finally passes via line (21) directly to waste gas discharge (20) of the apparatus. This current of waste gas can be fed to a further heat recovery.

The invention is explained in more detail in the following example which illustrate the embodiments of the invention.

EXAMPLE 1

1.1 Catalyst for zone 1

A commercially available $SiO_2$ carrier (Sudchemie, carrier "KA 3", balls 4–5 mm, bulk weight 0.6 g/l, specific surface approximately 170 m$^2$/g) was used as catalyst.

1.2 Catalyst for zone 2

1000 g γ-aluminum oxide balls (Rhone-Poulenc, "SCS 250", diameter 4–6 mm, bulk density 0.71 g/l, specific surface 253 m$^2$/g) are precoated in an impregnation drum with 300 ml dist. $H_2O$ (corresponds to ⅔ of the water absorption capacity of the carrier material) and subsequently impregnated with 150 ml of a solution containing Pt and Rh. The noble metal solution contains 0.5 g 16% $RhCl_3$ solution (corresponds to 0.08 g Rh and 6.4 g 25% $H_2PtCl_6$ solution (corresponds to 1.6 g Pt) and is preneutralized with 10% $Na_2CO_3$ solution in such a manner that pH 6 is obtained in the impregnation solution diluted with dist. $H_2O$ to 150 ml.

After the noble metal solution has been completely taken up by the porous carrier material, the catalyst is dried at 120° C. to constancy of weight and subsequently reduced 4 h at 400° C. under forming gas (95% by vol. $N_2$, 5% by vol. $H_2$). The finished catalyst contains 0.16% by wt. Pt and 0.008% by wt. Rh.

1.3 Conversion of a test gas mixture of CO, ethylene and ethyl chloride in a laboratory reactor A heatable tubular reactor of temperature-resistant steel is filled with 38 cm$^3$ (corresponds to 10 cm layer thickness) of each of the two catalysts (cf. points 1.1 and 1.2) so that a double-bed arrangement is created. The catalytic combination is loaded at different gas entrance temperatures into the first catalytic zone and at a constant loading (GHSV=15,000 h$^{-1}$) with a test gas mixture consisting of 1% by vol. CO
0.7% by vol. ethylene
0.5% by vol. ethylene chloride
remainder air and the degree of conversion achieved is measured behind the second catalytic zone. (Results cf. table 1) Temperature peaks occur thereby in the reaction zones which can be up to 300° C. above the gas entrance temperature in zone 1, depending on the catalytic combination of the examples mentioned in the following.

EXAMPLE 2

2.1 Catalyst for zone 1

Commercially available γ-aluminum oxide balls (Rhone-Poulenc, "SCS 250", diameter 2.4–4 mm, bulk density 0.71 g/cm$^3$, specific surface 253 m$^2$/g, total pore volume 52.2 cm$^3$/100 g) were used as catalyst for zone 1.

2.2 Catalyst for zone 2

A drilling core (diameter 20 mm, length 120 mm) from a honeycomb-shaped carrier of cordierite (Corning, 400 cells/inch$^2$, approximate composition: 14.0% by wt. MgO, 35.4% by wt. $Al_2O_3$, 49.6% by wt. $SiO_2$) is rinsed repeatedly with a 30% aqueous dispersion of γ-aluminum oxide and dried between the individual rinsing procedures 2 h per time at 200° C. in a current of hot air. It is subsequently tempered at 700° C. The carrier coated with $Al_2O_3$ (water absorption 14%) is then immersed into a solution with the following composition:
71.4 g $H_2PtCl_6$ (25% Pt ≙ 17.85 g Pt)
22.3 g $RhCl_3$ (16% Rh ≙ 3.57 g Rh)
in 100 ml solution
which is set to pH 6 with 10% NaOH.

After having dried, the carrier is coated with 0.3% by wt. noble metal in a weight ratio of Pt:Rh=5:1. Finally, the reduction of the separated noble metal compounds is performed in a current of hydrogen at a temperature of 500° C. for 1 h. The specific surface of the catalyst finished in this manner was 24 m²/g.

2.3 Catalyst testing analogous to example 1.3

(Results cf. table 1)

EXAMPLE 3

3.1 Catalyst for zone 1

The cordierite carrier mentioned in example 2.2 is rinsed repeatedly with a 30% aqueous dispersion of γ-aluminum oxide and magnesium oxide (weight ratio $Al_2O_3$:MgO=3:1), dried between the individual rinsing procedures 2 h per time at 200° C. in a current of hot air and then tempered at 600° C. The carrier coated in this manner (water absorption 18.6%) is subsequently immersed in a solution of 60 g $Ba(NO_3)_2$ in 1000 ml dist. $H_2O$. After having dried at 200° C. and a 3-hour tempering at 600° C. in a current of air, the finished catalyst contains 3.5% by wt. Mg and 0.56% by wt. Ba.

3.2 Catalyst for zone 2

200 g γ-aluminum oxide balls (Rhone-Poulenc, "SCS 79", diameter 2.4–4 mm, bulk density 0.67 g/l, specific surface 80 m²/g) are precoated in an impregnation drum with 60 ml dist. $H_2O$ (corresponds to ⅔ of the water absorbtion capacity of the carrier material) and subsequently impregnated with 30 ml of a solution containing Pd and Pt. The noble metal solution contains 7.5 g 20% $H_2PdCl_4$ solution (corresponds to 1.5 g Pd) and 1.2 g 25% $H_2PtCl_6$ solution (corresponds to 0.3 g Pt) and is preneutralized with 10% $Na_2CO_3$ solution to the extent that a pH of 6 is set in the solution diluted with dist. $H_2O$ to 30 ml.

After drying and reduction according to example 1.2, the finished catalyst contains 0.75% by wt. Pd and 0.15% by wt. Pt.

3.3 Catalyst testing analogous to example 1.3

(Results cf. table 1)

EXAMPLE 4

4.1 Catalyst for zone 1—analogous to example 3.1

4.2 Catalyst for zone 2

The preparation of the catalyst was performed as described in example 2.2; however, an impregnation solution of the following composition was selected:
71.4 g $H_2PtCl_6$ (25% Pt ≙ 17.85 g Pt)
17.85 g $H_2PdCl_4$ (20% Pd ≙ 3.57 g Pd)
in 1000 ml solution.
The finished catalyst was coated with 0.3% by wt. noble metal in a weight ratio of Pt:Pd=5:1.

4.3 Catalyst testing analogous to example 1.3

(Result cf. table 1)

EXAMPLE 5

5.1 Catalyst for zone 1

100 g of the annular $Al_2O_3$ extrudate "Al 3996 R" of the Harshaw company (bulk density 0.5–0.75 g/cm³, specific surface 200 m²/g, total pore volume approximately 0.69 cm³/g) are first impregnated with 70 ml of a solution of 60 g $Ni(NO_3)_2 \times 6H_2O$ in dist. $H_2O$ and dried at 110° to constancy of weight. The carrier preimpregnated in this manner is subsequently reimpregnated with an impregnation solution of 60 g $Ni(NO_3)_2 \times 6H_2O$ in 24 ml dist. $H_2O$, dried once again at 110° C. and finally calcined in a current of air at a rising temperature:
15 min. at 200° C.,
15 min. at 300° C.,
15 min. at 400° C.,
35 min. at 500° C.
The finished catalyst contains 20% by wt. nickel.

5.2 Catalyst for zone 2

200 g of the carrier material mentioned in example 3.2 are impregnated with a solution prepared by diluting 4 g of a 25% $H_2PtCl_6$ solution with dist. $H_2O$ to 90 ml.

After drying at 120° C. and a three-hour reduction with forming gas (90% by vol. $N_2$, 5% by vol. $H_2$) at 500° C., the finished catalyst contains 0.5% by wt. Pt.

5.3 Catalyst testing analogous to example 1.3

(Results cf. table 1)

EXAMPLE 6

6.1 Catalyst for zone 1—analogous to example 2.1

6.2 Catalyst for zone 2

200 g of the carrier material mentioned in example 3.2 are impregnated with a solution containing 5 g of a 20% $H_2PdCl_4$ solution and preneutralized with 10% NaOH to the extent that a pH of 4 is set in the solution diluted with dist. $H_2O$ to 90 ml.

After drying at 120° C. and reduction with forming gas (95% by vol. $N_2$, 5% by vol. $H_2$) at 250° C., the finished catalyst contains 0.5% by wt. Pd.

6.3 Catalyst testing analogous to example 1.3 but at 10 bars absolute pressure and once, after having reached the starting temperature, without reactor heating. The exothermicity of the conversion is sufficient to maintain the reaction even without an additional heat supply.

(Results cf. table 1)

EXAMPLE 7

7.1 Catalyst for zone 1

Commercially available γ-aluminum oxide pellets (Rhone-Poulenc, "SCS 250", diameter 6–8 mm, bulk density 0.69 g/cm³, specific surface 80 m²/g) are first precoated in a rotating impregnation drum with 15 l dist. $H_2O$ (corresponds to ⅔ of the water absorption capacity of the carrier material) and subsequently impregnated with 7.5 l of a solution containing Pd and Pt. The noble metal solution specifically contains 375 g 20% $H_2PdCl_4$ solution (corresponds to 75 g Pd) and 300 g 25% $H_2PtCl_6$ solution (corresponds to 75 g Pt). It is preneutralized with approximately 2.25 l 10% $Na_2CO_3$ solution to pH 6 and diluted with dist. $H_2O$ to 7.5 l.

As soon as the noble metal solution has been completely taken up by the carrier, the catalyst is dried at 120° C. until constancy of weight and subsequently reduced 3 h at 400° C. under forming gas (95% by vol. N$_2$, 5% by vol. H$_2$). The finished catalyst contains 0.15% by wt. Pd and 0.15% by wt. Pt.

7.3 Conversion of a waste gas from an industrial-scale production of vinyl chloride in a pilot reactor The first zone of the annular double-bed reactor shown in the single figure is filled with 60 l of the aluminum oxide pellets mentioned in 7.1 and the second zone with 70 l of the noble metal catalyst prepared as described in 7.2. After the heating phase, the pilot reactor is operated with waste gas from an industrial-scale VCM system at different temperatures and loads.

The burner setting remains unchanged during the entire test time:
Methane: 6 Nm$^3$/h
Combustion air: 75 Nm$^3$/h The hot burner gases are cooled off somewhat with 320 Nm$^3$/h secondary air for material reasons. A few test settings and test results are collated in table 2.

EXAMPLE 8

8.1 Catalyst for zone 1—analogous to example 7.1

8.2 Catalyst for zone 2

50 kg γ-aluminum oxide pellets (Rhone-Poulenc, "SCS 250", diameter 4–6 mm, bulk density 0.71 g/l, specific surface 253 m$^2$/g) are precoated with 15 l dist. H$_2$O and subsequently impregnated with 7.5 l of a solution containing Pt and Rh. The noble metal solution contains 25 g 16% RhCl$_3$ solution and 250 g 25% H$_2$Cl$_6$ solution, is preneutralized with 500 ml 10% Na$_2$CO$_3$ solution to pH 6 and diluted with distilled water to 7.5 l.

After the noble metal solution has been completely taken up by the carrier, the catalyst is dried at 120° C. until constancy of weight and subsequently reduced 4 h at 400° C. under forming gas (95% by vol. N$_2$, 5% by vol. H$_2$). The finished catalyst contains 0.125% by wt. Pt and 0.008% by wt. Rh. 8.3 Conversion of a waste gas from an industrial-scale production of vinyl chloride in a pilot reactor The testing of the above-mentioned catalysts takes place according to example 7 in the annular double-bed reactor with unchanged burner setting but with dosing in of 240 Nm$^3$/h secondary air. Typical test settings and results are collated in table 3.

Further variations and modifications of the foregoing will be apparent to those skilled in the art and are intended to be encompassed by the claims appended hereto.

German priority application P 37 31 688.5-43 is relied on and incorporated by reference.

TAB. 1

Test conditions and residual concentrations of CO, ethylene and ethyl chloride in the cleaned waste gas (Laboratory Tests)

| | Temperature (°C.) before Zone 1 | Residual contents in the cleaned gas | | | Pressure (bar) |
|---|---|---|---|---|---|
| | | CO (ppm) | C$_2$H$_4$ (%) | C$_2$H$_5$Cl (%) | |
| Example 1 | 300 | 7.1 | 0.6 | 7.6 | 1 |
| | 400 | 3.3 | <0.1 | 1.1 | 1 |
| Example 2 | 300 | 17.6 | 4.5 | 12.7 | 1 |
| | 600 | 2.7 | <0.1 | <0.1 | 1 |
| Example 3 | 300 | 3.0 | <0.1 | 8.8 | 1 |
| | 400 | 1.2 | <0.1 | 0.2 | 1 |
| Example 4 | 500 | 11.2 | 1.1 | 5.9 | 1 |
| | 600 | 7.4 | <0.1 | 1.1 | 1 |
| Example 5 | 300 | 10.8 | 0.8 | 9.0 | 1 |
| | 500 | 2.6 | <0.1 | <0.1 | 1 |
| Example 6 | 300 | 6.7 | 0.2 | 6.8 | 10 |
| | 400 | 3.1 | <0.1 | 0.6 | 10 |
| | without reactor heating | 29.2 | 1.3 | 9.3 | 10 |

TAB. 2

Test conditions and composition of noxious gas and clean gas (Example 7)*) - Pilot System

| Test Setting | 1 | | 2 | | 3 | | 4 | |
|---|---|---|---|---|---|---|---|---|
| Waste gas current (Nm/h) | 300 | | 300 | | 300 | | 650 | |
| Temperature (°C.) | before Zone 1 | after Zone 2 | before Zone 1 | after Zone 2 | before Zone 1 | after Zone 2 | before Zone 1 | after Zone 2 |
| | 510 | 650 | 450 | 600 | 435 | 575 | 460 | 675 |
| CO | 0.83 Volume % | 7.2 ppm | 0.85 Volume % | 9 ppm | 0.83 Volume % | 12 ppm | 0.81 Volume % | 37 ppm |
| CH$_4$ | 61 ppm | 2 ppm | 61 ppm | 23 ppm | 65 ppm | 30 ppm | 76 ppm | 3 ppm |
| C$_2$H$_4$ | 0.44 Volume % | 5 ppm | 0.54 Volume % | 16 ppm | 0.56 Volume % | 10 ppm | 0.57 Volume % | 5 ppm |
| C$_2$H$_6$ | 0.10 Volume % | <1 ppm | 0.06 Volume % | 5 ppm | 0.09 Volume % | 11 ppm | 0.08 Volume % | <1 ppm |
| CH$_3$Cl | 5 ppm | <1 ppm | 5 ppm | <1 ppm | 3 ppm | <1 ppm | 4 ppm | <1 ppm |
| VCM | 21 ppm | <1 ppm | 17 ppm | <1 ppm | 17 ppm | <1 ppm | 25 ppm | <1 ppm |
| C$_2$H$_5$Cl | 0.016 Volume % | <1 ppm | 0.014 Volume % | <1 ppm | 34 ppm | <1 ppm | 0.013 Volume % | <1 ppm |
| 1,2-EDC | 2 ppm | <1 ppm | 20 ppm | <1 ppm | 1 ppm | <1 ppm | 64 ppm | <1 ppm |
| aro hydrocarbons | 0.01 Volume % | <1 ppm | 85 ppm | <1 ppm | 65 ppm | <1 ppm | 95 ppm | <1 ppm |

Test conditions and composition of noxious gas and clean gas (Example 7)

| Test Setting | 5 | 6 | 7 | 8 |
|---|---|---|---|---|
| Waste gas current (Nm$^3$/h) | 650 | 650 | 1000 | 1000 |

TAB. 2-continued

| Temperature (°C.) | before Zone 1 448 | after Zone 2 650 | before Zone 1 430 | after Zone 2 600 | before Zone 1 410 | after Zone 2 650 | after Zone 1 355 | before Zone 2 576 |
|---|---|---|---|---|---|---|---|---|
| CO | 0.84 Volume % | 38 ppm | 0.90 Volume % | 29 ppm | 0.83 Volume % | 23 ppm | 0.88 Volume % | 25 ppm |
| $CH_4$ | 65 ppm | 6 ppm | 64 ppm | 14 ppm | 53 ppm | 12 ppm | 58 ppm | 18 ppm |
| $C_2H_4$ | 0.44 Volume % | 14 ppm | 0.48 Volume % | 22 ppm | 0.47 Volume % | 26 ppm | 0.54 Volume % | 21 ppm |
| $C_2H_6$ | 0.06 Volume % | <1 ppm | 0.06 Volume % | 3 ppm | 0.09 Volume % | <1 ppm | 0.06 Volume % | 26 ppm |
| $CH_3Cl$ | 4 ppm | <1 ppm | 3 ppm | <1 ppm | 6 ppm | <1 ppm | 3 ppm | <1 ppm |
| VCM | 21 ppm | <1 ppm | 21 ppm | <1 ppm | 22 ppm | <1 ppm | 22 ppm | <1 ppm |
| $C_2H_5Cl$ | 0.01 Volume % | <1 ppm | 67 ppm | <1 ppm | 0.018 Volume % | <1 ppm | 56 ppm | <1 ppm |
| 1,2-EDC | 0.012 Volume % | <1 ppm | 0.017 Volume % | <1 ppm | 6 ppm | <1 ppm | 11 ppm | <1 ppm |
| aromat hydrocarbons | 99 ppm | <1 ppm | 0.045 Volume % | <1 ppm | 0.014 Volume % | <1 ppm | 86 ppm | <1 ppm |

*)The results cited were determined during a long-term test extending over several months. Therefore, in a direct comparison of measured results, different deactivations stages of the catalyst are to be taken into consideration.

TAB. 3

Test conditions and composition of noxious gas and clean gas (Example 8)*) - Pilot System

| Time Setting | 1 | | 2 | | 3 | | 4 | |
|---|---|---|---|---|---|---|---|---|
| Waste gas current (Nm³/h) | 1100 | | 1100 | | 900 | | 900 | |
| Temperature (°C.) | before Zone 1 490 | after Zone 2 730 | before Zone 1 440 | after Zone 2 670 | before Zone 1 500 | after Zone 2 710 | before Zone 1 425 | after Zone 2 650 |
| CO | 0.87 Volume % | 34 ppm | 0.85 Volume % | 52 ppm | 0.82 Volume % | 25 ppm | 0.86 Volume % | 55 ppm |
| $CH_4$ | 63 ppm | 3 ppm | 94 ppm | 39 ppm | 73 ppm | 7 ppm | 77 ppm | 29 ppm |
| $C_2H_4$ | 0.49 Volume % | 2 ppm | 0.45 Volume % | 43 ppm | 0.46 Volume % | 8.5 ppm | 0.53 Volume % | 39 ppm |
| $C_2H_6$ | 0.06 Volume % | <1 ppm | 0.06 Volume % | 4.2 ppm | 0.05 Volume % | <1 ppm | 0.05 Volume % | 38 ppm |
| $CH_3Cl$ | 2.8 ppm | <1 ppm | 3.3 ppm | <1 ppm | — | — | — | — |
| VCM | 27 ppm | <1 ppm | 27 ppm | <1 ppm | 24 ppm | <1 ppm | 24 ppm | <1 ppm |
| $C_2H_5Cl$ | 42 ppm | <1 ppm | 43 ppm | <1 ppm | 63 ppm | <1 ppm | 74 ppm | <1 ppm |
| 1,2-EDC | 4 ppm | <1 ppm | 62 ppm | <1 ppm | 13 ppm | <1 ppm | 0.010 ppm | <1 ppm |
| aromat hydrocarbons | 51 ppm | <1 ppm | 63 ppm | <1 ppm | 89 ppm | <1 ppm | 87 ppm | <1 ppm |

Test conditions and composition of noxious gas and clean gas (Example 8)

| Time Setting | 5 | | 6 | |
|---|---|---|---|---|
| Waste gas current (Nm³/h) | 700 | | 700 | |
| Temperature (°C.) | before Zone 1 490 | after Zone 2 670 | before Zone 1 565 | after Zone 2 735 |
| CO | 0.82 volume % | 23 ppm | 0.83 Volume % | 15 ppm |
| $CH_4$ | 74 ppm | 14 ppm | 72 ppm | <1 ppm |
| $C_2H_4$ | 0.49 Volume % | 20 ppm | 0.38 Volume % | <1 ppm |
| $C_2H_6$ | 0.06 Volume % | 1 ppm | 0.06 Volume % | <1 ppm |
| $CH_3Cl$ | — | — | — | — |
| VCM | 57 ppm | <1 ppm | 23 ppm | <1 ppm |
| $C_2H_4Cl$ | 22 ppm | <1 ppm | 66 ppm | <1 ppm |
| 1,2-EDC | <1 ppm | <1 ppm | 1 ppm | <1 ppm |
| aromat hydrocarbons | 78 ppm | <1 ppm | 73 ppm | <1 ppm |

*)The results cited were determined during a long-term test extending over several months. Therefore, in a direct comparison of measured results, different deactivations stages of the catalyst are to be taken into consideration.

We claim:

1. An apparatus for purifying waste gases comprising a cylindrical reactor housing (1) having an upper portion forming a head chamber (15) and at a lower portion forming a preheating and mixing chamber (13), said preheating and mixing chamber (13) being connected via a heat exchanger (12) with a waste gas supply pipe (22) while said head chamber (15) is connected to an outlet pipe (16) which branches at a branching point (17) into a shunt pipe (18) and an exhaust pipe (20); said shunt pipe (18) being connected to an inlet port for the heating medium of said heat exchanger (12) of which the outlet port for the heating medium is connected to said exhaust pipe (20) by another pipe (21); said exhaust pipe (20) having a closing member (19) located between said branching point (17) and the point of intersection with said another pipe (21);

said reactor housing (1) including a catalytic section being separated from said preheating and mixing chamber (13) by an annular bottom (2) having a central hole (3) with a circumferential edge (10); said reactor housing (1) catalytic section including an arrangement of two coaxial annular cages (5,6) for receiving bulk catalytic material so as to form two catalytic layers; said annular cages (56) being formed by three conical wall members (7,8,9) including an inner wall (7), a separating wall (8), an outer wall (9);

said conical wall members being perforated and resting with their bases on said annular bottom (2) of said reactor housing (1) catalytic section and being closed at the top by a common plate (4);

said conical wall members (7,8,9) being sealed to said annular bottom (2) in a gastight manner whereby said inner wall (7) forms a circumferential border on said annular bottom (2) which coincides with said circumferential edge (10) of said central hole (3);

said reactor housing (1) and said outer wall (9) forming an annular space (11) with increasing cross section from the bottom to the top of said housing (1) catalytic section due to the shrinking diameter of said outer wall (9); said preheating and mixing chamber (13) being laterally connected to a pipe (14) for the supply of a gaseous heating medium said common plate closing a passage formed by inner wall (7) and said central hole so as to force waste gases passing into said central hole through the catalytic material, into said annular space and then toward said outlet pipe.

* * * * *